US008335986B2

(12) United States Patent  
Carlen et al.

(10) Patent No.: US 8,335,986 B2  
(45) Date of Patent: Dec. 18, 2012

(54) PREVIEWING DIFFERENT TYPES OF DOCUMENTS

(75) Inventors: Conrad Carlen, Burlingame, CA (US); Patrick Coffman, Menlo Park, CA (US); Ryan Staake, Providence, RI (US); Matthew Sarnoff, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 313 days.

(21) Appl. No.: 12/610,040

(22) Filed: Oct. 30, 2009

(65) Prior Publication Data

US 2011/0055691 A1    Mar. 3, 2011

Related U.S. Application Data

(60) Provisional application No. 61/237,134, filed on Aug. 26, 2009.

(51) Int. Cl.  
 *G06F 17/00* (2006.01)
(52) U.S. Cl. ....................................................... 715/274
(58) Field of Classification Search .................. 715/273, 715/274, 200  
See application file for complete search history.

(56) References Cited

U.S. PATENT DOCUMENTS

| | | | | |
|---|---|---|---|---|
| 5,839,019 A * | 11/1998 | Ito | ................................. | 399/45 |
| 5,943,679 A * | 8/1999 | Niles et al. | ..................... | 715/247 |
| 6,219,069 B1 * | 4/2001 | McKeeth | ....................... | 345/473 |
| 7,689,933 B1 * | 3/2010 | Parsons | ......................... | 715/838 |
| 7,693,912 B2 * | 4/2010 | Rose et al. | ..................... | 707/779 |
| 7,840,564 B2 * | 11/2010 | Holzgrafe et al. | ............ | 707/738 |
| 2001/0043365 A1 * | 11/2001 | Kremer et al. | ................ | 358/1.16 |
| 2002/0116421 A1 * | 8/2002 | Fox et al. | ...................... | 707/526 |
| 2004/0201613 A1 * | 10/2004 | Simpson et al. | ............... | 345/738 |
| 2005/0102610 A1 * | 5/2005 | Jie | .................. | 715/513 |
| 2006/0017736 A1 * | 1/2006 | McKeeth | ....................... | 345/473 |
| 2006/0033762 A1 * | 2/2006 | Card et al. | ..................... | 345/660 |
| 2006/0072721 A1 * | 4/2006 | Wisniewski | ............... | 379/88.22 |
| 2007/0100915 A1 * | 5/2007 | Rose et al. | ..................... | 707/205 |
| 2007/0113164 A1 * | 5/2007 | Hansen et al. | ................ | 715/500 |
| 2008/0040810 A1 * | 2/2008 | Kurokawa | ........................ | 726/27 |
| 2008/0235563 A1 * | 9/2008 | Nakamura | ....................... | 715/200 |
| 2009/0313236 A1 * | 12/2009 | Hernacki et al. | .................. | 707/5 |
| 2010/0315359 A1 * | 12/2010 | Seong et al. | ................... | 345/173 |
| 2011/0060740 A1 * | 3/2011 | Holzgrafe et al. | ............ | 707/737 |
| 2011/0063404 A1 * | 3/2011 | Raffle et al. | ................ | 348/14.08 |

OTHER PUBLICATIONS

Hu et al., Identifying Story and Preview Images in News Web Pages, IEEE 2003, pp. 1-5.*  
Brunk et al., Toward an Agileviews WWW Sitemap Kit: The Generalized Relation Browser, Google 2000, pp. 1-18.*  
Liesaputra et al., Creating and Reading Realistic Electronic books, IEEE Feb. 2009, pp. 72-79.*

* cited by examiner

*Primary Examiner* — Cong-Lac Huynh (57) ABSTRACT

This is directed to a preview application for displaying several documents simultaneously in a single window, where the several documents are displayed as books. To view the pages of a document, the preview application can open the book and display the pages of the document (e.g., in a one or two-dimensional array). A user can also search for particular terms within the several documents. In response to a search, the preview application can filter the pages of the several documents and only display those pages that include the search terms. The displayed pages can be ordered in any suitable manner, including for example by search rank.

14 Claims, 9 Drawing Sheets

PREVIEWING DIFFERENT TYPES OF DOCUMENTS

CROSS-REFERENCE TO RELATED APPLICATION

This application claims priority to U.S. Provisional Patent Application No. 61/237,134, filed Aug. 26, 2009, which is incorporated by reference herein in its entirety.

FIELD OF THE INVENTION

This is directed to previewing several types of documents using a single preview application. In particular, this is directed to a single preview application for previewing and searching through different types of documents opened by different applications.

BACKGROUND OF THE INVENTION

Using an electronic device, a user can preview different documents without opening the application used to create, edit, or revise the document. For example, a preview application can be used to allow a user to preview files typically opened using Microsoft Word and Microsoft PowerPoint (applications available from Microsoft Corporation of Redmond, Wash.), Keynote and Pages (applications available from Apple Inc. of Cupertino, Calif.), and Acrobat (application available from Adobe Systems Inc. of San Jose, Calif.) using a single application. Because the preview application may have limited functionality when compared to the applications used to create or edit the documents (i.e., the preview application may only allow a user to view documents), the preview application can load faster than the applications and provide a more efficient use of the device resources for previewing documents.

Each time a user may wish to preview a document, the user can direct the electronic device to open distinct preview windows for each document. For example, the user can direct the electronic device to open a first preview window for an image document (e.g., a .tiff document), a second preview window for a first text document (e.g., a first .pdf document), and a third preview window for a second text document (e.g., a second .pdf document). This approach, however, may be burdensome when a user wishes to review information simultaneously in several documents via the preview application (i.e., this approach may force the user to switch between preview windows). In addition, to search for a particular term in each of the documents, the user may be required to perform individual searches in each window.

SUMMARY OF THE INVENTION

This is directed to systems, methods and computer-readable media for providing a preview application operative to simultaneously preview several documents. In particular, this is directed to a preview application for simultaneously previewing and searching through several documents of one or more types.

Using a display, an electronic device can display different documents generated using different applications. The application associated with each document can be used to open, view, edit, save, or convert the document, or perform any other operation with or on the document. When a user wishes to view several documents of different types (e.g., associated with different applications), the user may be forced to execute each application. This can be time and resource consuming, as each application may provide more features than the user actually needs, but that nevertheless are enabled when the application is loaded. As an alternative, the electronic device can use a dedicated preview application that is operative to display different types of documents that are created using other applications. The preview application may have limited functionality, and for example not allow a user to edit a document. Because of its limited functionality, however, the preview application can allow a user to view several documents of different types using a single application in a resource efficient manner.

The preview application can display several documents using different approaches. In one implementation, the electronic device can display each document in a separate window. Alternatively, the electronic device can display several documents of one or more type in the same window. The electronic device can distinguish each document using any suitable approach, including for example by placing each document in a separate section or area of the window (e.g., each document is placed in a book). In some embodiments, each document can be displayed via a transparent cover that can be flipped open to access the pages within the document. The preview application can display the pages of each document using different approaches. In one embodiment, the preview application can display a current page in a large window, and the other pages of each document in a one-dimensional array (e.g., a vertical column of several documents, where each document can include several displayed pages). In another embodiment, the preview application can display each document and its respective pages in a two-dimensional array (e.g., each document and its pages can be displayed in one or more rows of the preview application).

A user can search for particular terms in each of the documents displayed in the preview application using a single interface. The preview application can identify the pages in each of the documents that include the search term, and display only the identified pages to the user for review. The preview application can in addition include an indication of the number of hits in each page (e.g., a search rank indicating the number of hits on each page).

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to a preview application for simultaneously previewing several documents. In particular, this is directed to displaying pages of several documents in different configurations, and providing search results in the preview interface.

Figure 1:
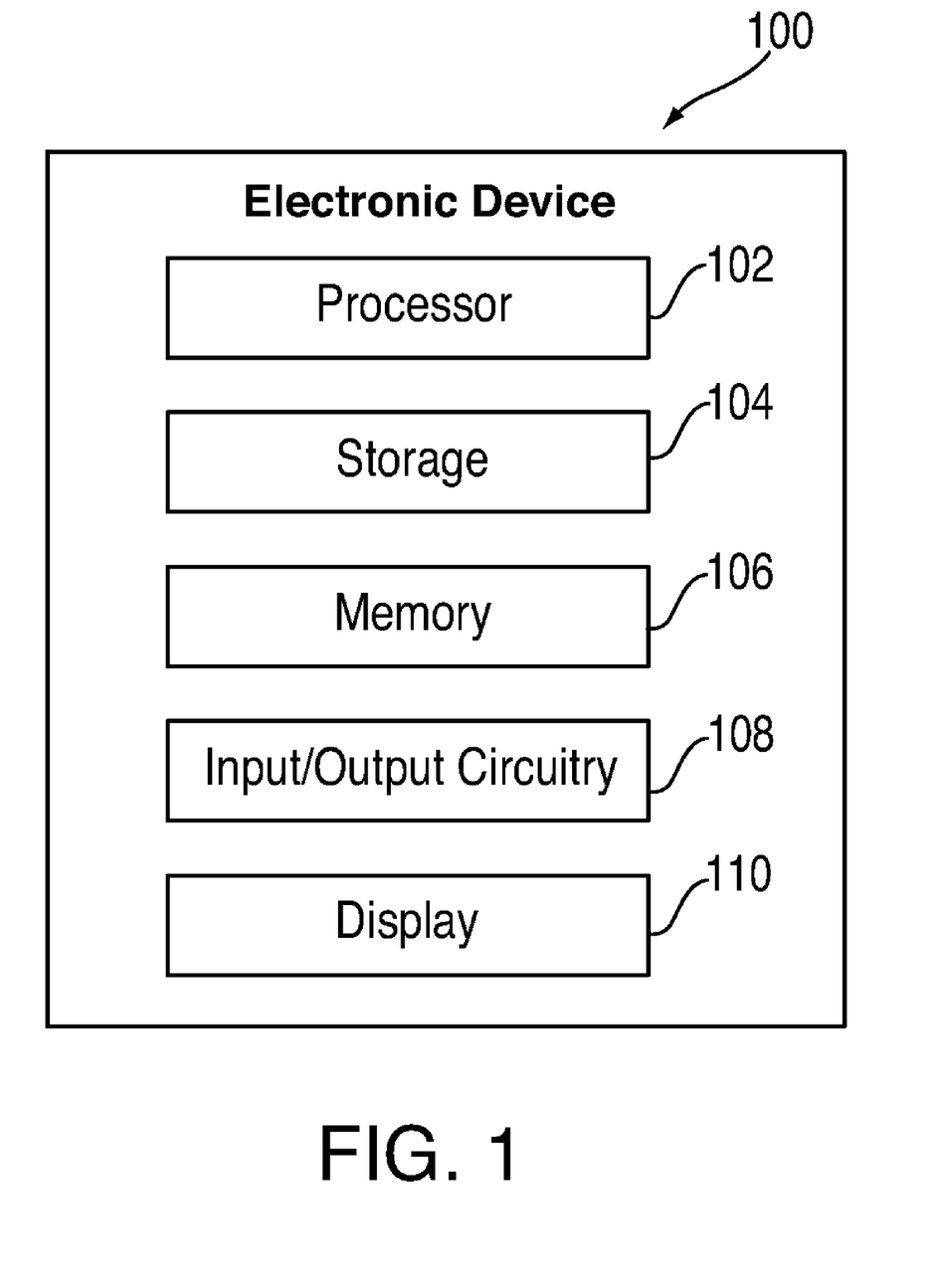
FIG. 1 is a schematic view of an illustrative electronic device for executing a preview application in accordance with one embodiment of the invention.

FIG. 1 is a schematic view of an illustrative electronic device for executing a preview application in accordance with one embodiment of the invention. Electronic device 100 can include any suitable type of electronic device operative to display information to a user. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a music recorder, a video recorder, a gaming device, a camera, radios, medical equipment, and any other portable electronic device having a display from which a user can select a portion of displayed objects.

Electronic device 100 can include a processor or control circuitry 102, storage 104, memory 106, input/output circuitry 108, and display 110 as typically found in an electronic device of the type of electronic device 100, and operative to enable any of the uses expected from an electronic device of the type of electronic device 100 (e.g., connect to a host device for power or data transfers). In some embodiments, one or more of electronic device components 100 can be combined or omitted (e.g., combine storage 104 and memory 106), electronic device 100 can include other components not combined or included in those shown in FIG. 1 (e.g., communications circuitry or positioning circuitry), or electronic device 100 can include several instances of the components shown in FIG. 1. For the sake of simplicity, only one of each of the components is shown in FIG. 1.

Control circuitry 102 can include any processing circuitry or processor operative to control the operations and performance of electronic device 100. Storage 104 can include, for example, one or more storage mediums including a hard-drive, solid state drive, flash memory, permanent memory such as ROM, any other suitable type of storage component, or any combination thereof. Memory 106 can include cache memory, semi-permanent memory such as RAM, and/or one or more different types of memory used for temporarily storing data. In some embodiments, memory 106 and storage 104 can be combined as a single storage medium. Input/output circuitry 108 can be operative to convert (and encode/decode, if necessary) analog signals and other signals into digital data. Input/output circuitry 108 can be coupled to or include any suitable input interface, such as for example, a button, keypad, dial, a click wheel, or a touch screen, as well as any suitable output circuitry associated with output devices (e.g., audio outputs or display circuitry or components).

Display 110 can be operatively coupled to control circuitry 102 for providing visual outputs to a user. Display 110 can include any suitable type of display, including for example a liquid crystal display (LCD) (e.g., active matrix, passive matrix and the like), a monochrome display, color graphics adapter (CGA) display, enhanced graphics adapter (EGA) display, variable-graphics-array (VGA) display, super VGA display, cathode ray tube (CRT), a plasma display, a display implemented with electronic inks, or any other suitable display. Display 110 can be configured to display a graphical user interface that can provide an easy to use interface between a user of the computer system and the operating system or application running on the system.

In some embodiments, electronic device 100 can include a bus operative to provide a data transfer path for transferring data to, from, or between control processor 102, storage 104, memory 106, input/output circuitry 108, display 110 and any other component included in the electronic device.

Figure 2:
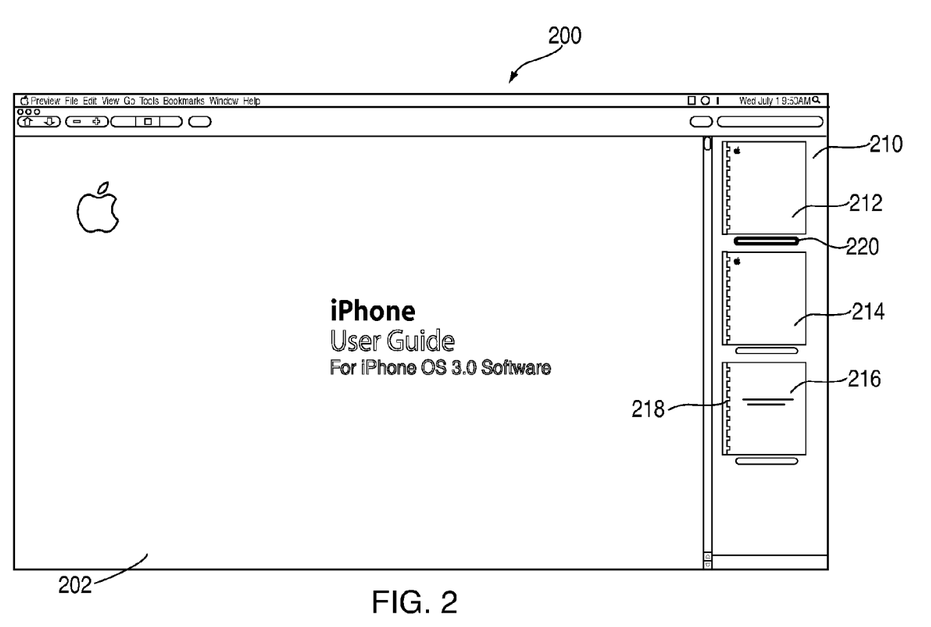
FIG. 2 is a schematic view of an illustrative preview application window in accordance with one embodiment of the invention.

The electronic device can display any suitable document or pages of documents to a user of the device. FIG. 2 is a schematic view of an illustrative preview application window in accordance with one embodiment of the invention. Display 200 can include an interface for displaying several different documents being previewed. In particular, display 200 can include display area 202 for displaying a page of a previewed document, and sidebar or column 210 listing the selected documents available for preview. The preview application can be used to view and search through any suitable type of document, including for example documents created using word processing applications, spreadsheet applications, imaging applications, portable document applications (e.g., applications for .pdf and .ps documents), or any other type of document by which information can be displayed to the user. The documents can include one or more pages, and in some cases include searchable components (e.g., searchable text or searchable image elements).

The user can select to preview any suitable number of documents. In the example of FIG. 2, a user can select to preview three documents (e.g., documents 212, 214 and 216, shown in column 210). Each document can be depicted using any suitable approach. In one embodiment, each document can be depicted as a book or booklet having spiral binding 218 and a transparent cover (not visible in display 200) such that the first page of each document is visible through the cover. The user can select one of the displayed documents using any suitable approach, including for example highlight region 220. The first page of the highlighted document can be displayed in display area 202 for the user to preview.

Figure 3:
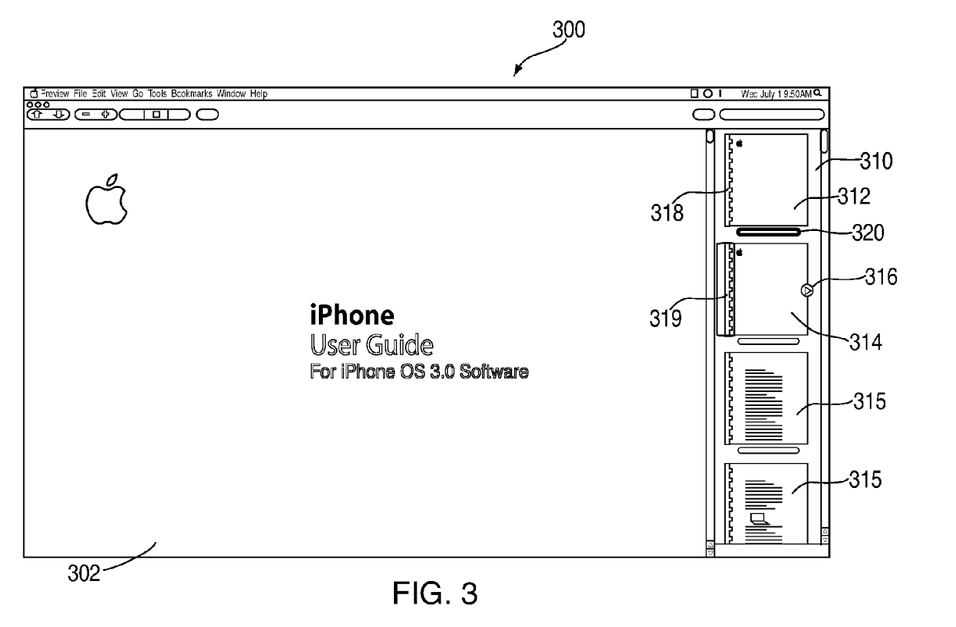
FIG. 3 is a schematic view of an illustrative preview application window in which a document is opened in accordance with one embodiment of the invention.

To view the individual pages of a document, the user can direct the device to open the book associated with the document. FIG. 3 is a schematic view of an illustrative preview application window in which a document is opened in accordance with one embodiment of the invention. Display 300 can include some or all of the features of display 200 (FIG. 2). In particular, display 300 can include display area 302 and column 310 having some or all of the features of the corresponding elements of display 200. In response to a user request to view the pages of document 314, the preview application can include a listing of individual pages 315 of the document. To further illustrate that pages of document 314 are open, display 300 can include translucent cover 319 folded back over spiral binding 318, as if the cover were opened on a book. In some embodiments, the preview application can include an animation showing the cover flip open. The user can close the book and remove the displayed pages of document 314 using any suitable approach, including for example by selecting displayed option 316. The preview application can then apply an animation to cover 319, closing the book. In some embodiments, cover 319 can become indistinguishable from the first page of the document when closed.

The preview application can display any suitable document page in display area 302 after opening a document (e.g., opening the book generated for a document). In some embodiments, the preview application can automatically display a page of the opened document. In another embodiment, the preview application can display the document or page identified by a selection option or highlight region (e.g., highlight region 320).

Figure 4:
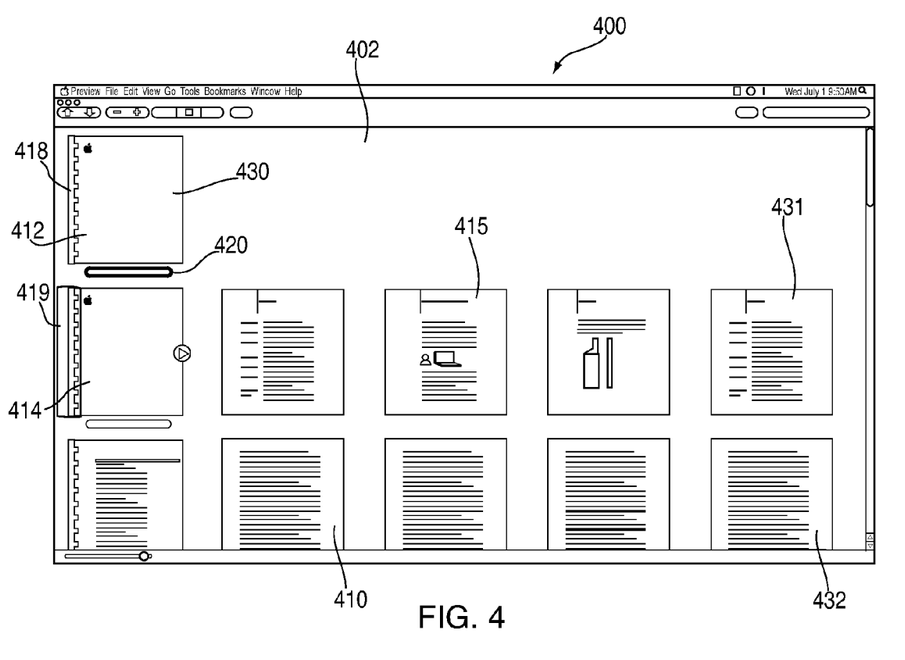
FIG. 4 is a schematic view of an illustrative preview application window having a two-dimensional array of documents in accordance with one embodiment of the invention.

In some embodiments, the preview application can display documents and their associated pages in a two-dimensional array (in addition to or instead of the one-dimensional column of displays 200 and 300, FIGS. 2 and 3). FIG. 4 is a schematic view of an illustrative preview application window having a two-dimensional array of documents in accordance with one embodiment of the invention. Display 400 can include display area 402 in which two-dimensional array 410 of documents and their associated pages can be displayed. Array 410 can include documents 412 and 414, each depicted as books (e.g., indicated by spiral binding 418) on separate lines (e.g., lines 430 and 431, respectively). The user can open or close the books in a manner similar to that described above in connection with displays 200 and 300 (FIGS. 2 and 3), and the preview application can indicate the status of a book (e.g., open or closed) using transparent or translucent cover 419. When a document is opened, the pages of the document can be displayed in the same line as the initial document (e.g., line 431), and continue along the following lines (e.g., line 432) ahead of the next document in display area 402. To view a particular page in display area 402, the user can select the page using highlight region 420 and direct the application to display a large screen view of the page (e.g., revert to display 300 in which display area 302 is used for the selected page). When the user closes a document (e.g., using any of the approaches described above, including for example selecting a displayed option), the preview application can hide from view the displayed pages of the document and display at least the cover corresponding to the next document in the line following the closed document (e.g., display the cover and/or pages of the document on line 432).

Figure 5:
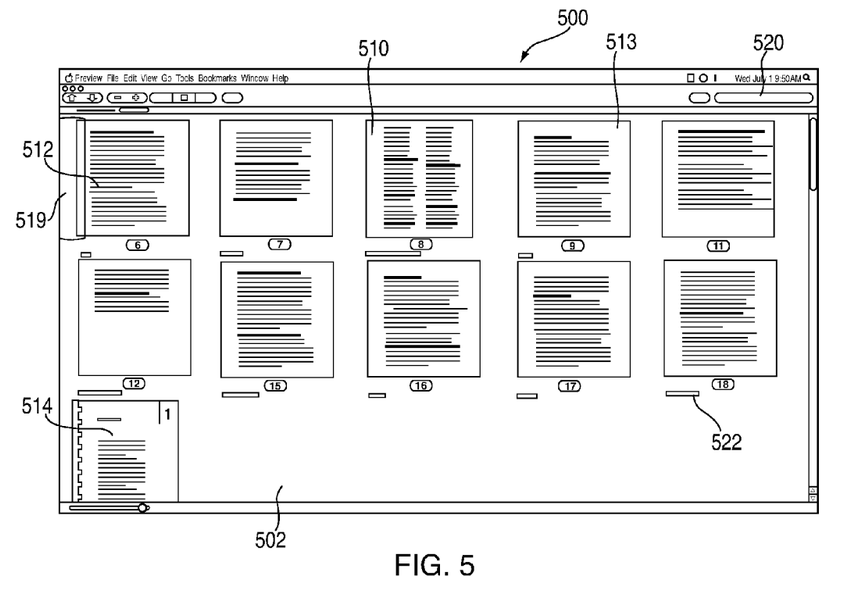
FIG. 5 is a schematic view of an illustrative preview application window for performing a search in accordance with one embodiment of the invention

In some embodiments, a user may wish to search for particular terms in one or more documents accessed by the preview application. For example, a user may wish to find a term or phrase in several documents to determine which of the documents to open and edit. FIG. 5 is a schematic view of an illustrative preview application window for performing a search in accordance with one embodiment of the invention. The preview application can include a search field in which the user can enter search terms. Display 500 can include display area 502 in which two-dimensional array 510 of documents 512 and 514 and their associated pages can be displayed. The user can open or close the books in a manner similar to that described above in connection with displays 200 and 300 (FIGS. 2 and 3), and the preview application can indicate the status of a book (e.g., open or closed) using transparent or translucent cover 519.

The user can search for one or more particular terms using any suitable approach, including for example by entering a search term in search field 520. In response to receiving the search request, the electronic device can identify all of the instances of the search term in each of the documents of display area 502, and filter the pages of each individual document to only display those pages 513 that include at least one instance of the search terms. The preview application can provide an indication of the number of hits in each displayed page using any suitable approach, including for example by highlighting hits within each text page, or via search rank indicator 522 (e.g., a bar of varying length, the length determined from the number of hits). In some embodiments, the preview application can initially limit the number of displayed pages (e.g., to two lines) to ensure that the user can view results from every document. The user can, by providing a corresponding instruction, expand the displayed results to include more or all of the hits in each previewed document.

Figure 6:
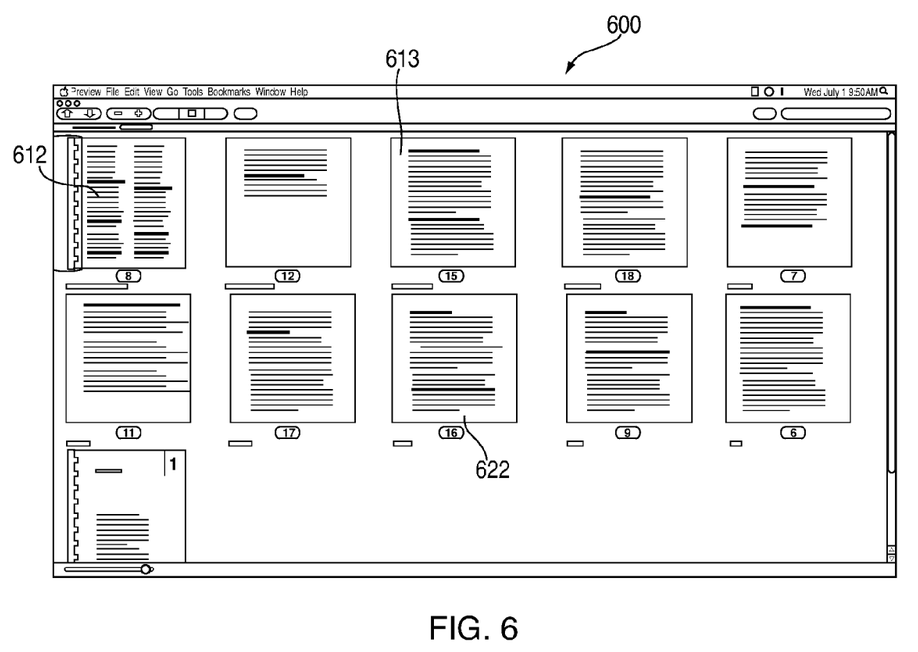
FIG. 6 is a schematic view of the illustrative preview application window of FIG. 5 in which the search results are re-ordered in accordance with one embodiment of the invention.

The search results can be ordered using any suitable approach. In some embodiments, the search results can be displayed in page order of the previewed document. Alternatively, the search results can be displayed by number of hits. FIG. 6 is a schematic view of the illustrative preview application window of FIG. 5 in which the search results are re-ordered in accordance with one embodiment of the invention. Display 600, which can include some or all of the features of display 500 (FIG. 5), can include pages 613 of document 612 ordered based on the number of hits (e.g., graphically represented by search rank indicator 622). The preview application can keep the search results separated by document (e.g., not mix pages from different documents in the displayed results), or can instead combine all search results into a single display configuration (e.g., a two dimensional array including all search results independent of the documents from which the search result pages originate).

Figure 7:
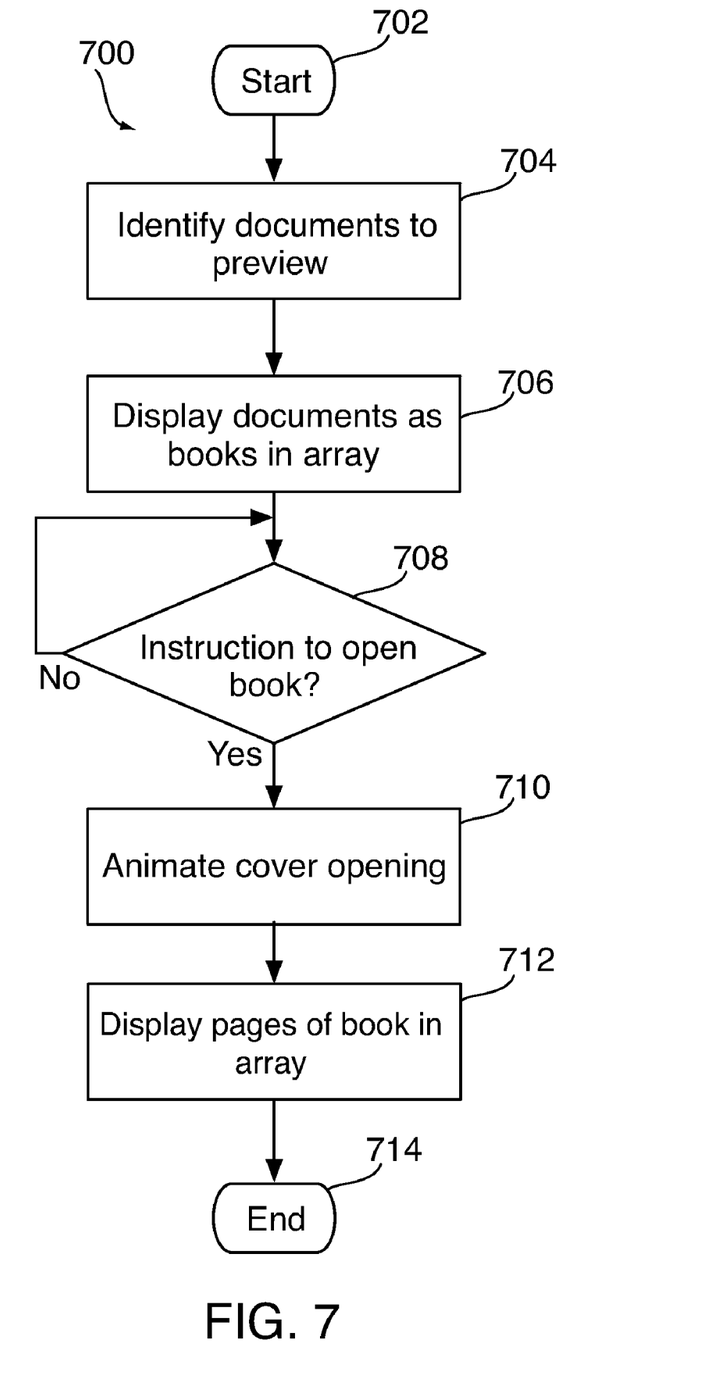
FIG. 7 is a flowchart of an illustrative process for displaying documents in a preview application window in accordance with one embodiment of the invention.

FIG. 7 is a flowchart of an illustrative process for displaying documents in a preview application window in accordance with one embodiment of the invention. Process 700 can begin at step 702. At step 704, the electronic device can identify documents to preview using the preview application. For example, the electronic device can identify particular documents of one or more type and associated with one or more applications selected by a user. At step 706, the electronic device can display the documents as an array of books. For example, the electronic device can display the books in a one or two-dimensional array. Each document can include a spiral binding indicative of additional pages within the document, and a transparent or translucent cover placed over the document. To assist the user in identifying the content of each document, the displayed books can include a representation of the first page of the identified documents.

At step 708, the electronic device can determine whether an instruction to open a book was received. For example, the electronic device can detect a user provided an instruction to view the pages of a previewed document. If the electronic device determines that no instruction to open a book was received, process 700 can return to step 708 and continue to monitor for an instruction to open a book. If, at step 708, the electronic device instead determines that an instruction to open a book was received, process 700 can move to step 710.

At step 710, the electronic device can animate a cover opening on the book. For example, the electronic device can animate a transparent or translucent page opening from over the first page of the document and folding around the displayed spiral binding. At step 712, the electronic device can display the pages of the book in an array. For example, the electronic device can insert the pages of the document within a one-dimensional array of documents being previewed. As another example, the electronic device can insert the pages in a two-dimensional array (e.g., pages in successive rows started with the cover page of the document). Process 700 can then end at step 712.

Figure 8:
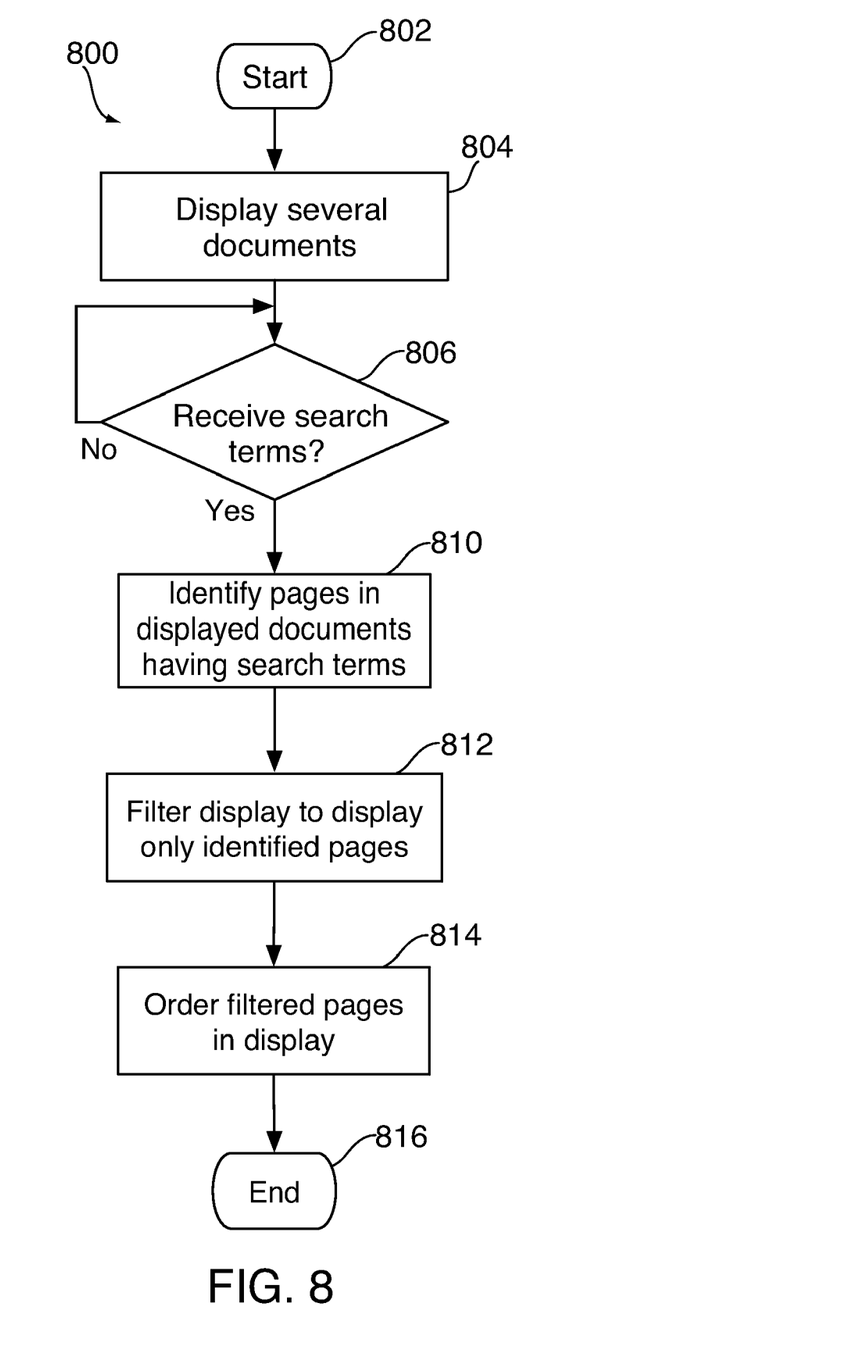
FIG. 8 is a flowchart of an illustrative process for searching through documents in a preview application in accordance with one embodiment of the invention.

FIG. 8 is a flowchart of an illustrative process for searching through documents in a preview application in accordance with one embodiment of the invention. Process 800 can begin at step 802. At step 804, the electronic device can display several documents using a preview application. The several documents can be of the same or different type, and can be displayed using any suitable configuration. At step 806, the electronic device can determine whether search terms were received. For example, the electronic device can determine whether the user provided search terms in a search field. If the electronic device determines that no search terms were received, process 800 can return to step 806 and continue to monitor for search terms.

If, at step 806, the electronic device instead determines search terms were received, process 800 can move to step 808. At step 808, the electronic device can identify pages in the displayed documents that have the received search terms. For example, the electronic device can identify instances within the pages of each document that match the search terms. At step 812, the electronic device can filter the display of pages to display only the identified pages that include the search terms. For example, the electronic device can direct the preview application to automatically remove from display pages of documents that do not include the search terms. At step 814, the electronic device can order the filtered pages in the display. For example, the electronic device can order the pages based on the order of the pages within each document. As another example, the electronic device can order the pages based on the number of hits on each page. In some embodiments, the electronic device can keep each document distinct, or can intermingle the pages of each document that include the search terms in the display (e.g., based on the ordering used for the identified pages). Process 800 can then end at step 816.

Figure 9:
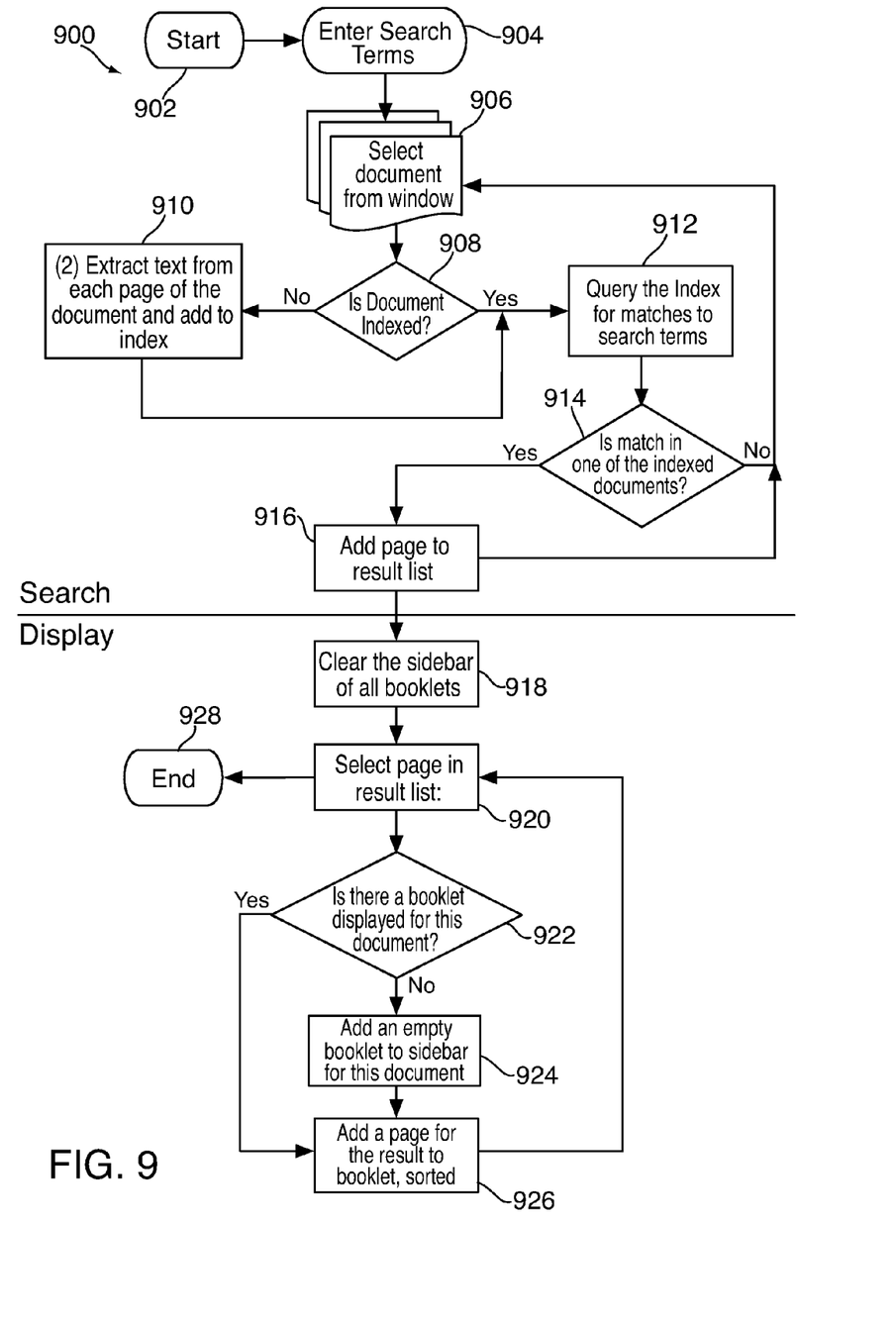
FIG. 9 is a flowchart of an illustrative process for multi-document search in a preview application in accordance with one embodiment of the invention.

FIG. 9 is a flowchart of an illustrative process for multi-document search in a preview application in accordance with one embodiment of the invention. Process 900 can begin at step 902. At step 904, the electronic device can receive entered search terms. For example, the electronic device can detect an input from an input interface providing search terms in a search field. At step 906, the electronic device can select a first open document of the preview window. For example, the electronic device can select an as of yet unselected document open in the preview window (e.g., the process can recursively select each document in the window). In some embodiments, each page of a document can be considered a distinct document for process 900, which can allow each page of a document to be added to the index as a distinct element (e.g., document) because a search index can map terms to elements. By storing each page as a separate element, the application can determine the search relevance on a per-page basis, instead of on a per-document basis. At step 908, the electronic device can determine whether the currently selected document is indexed. For example, the electronic device can determine whether there is an index entry associated with the selected device. If the electronic device determines that the document is not indexed, process 900 can move to step 910. At step 910, the electronic device can extract text from each page of the document and add it to index. For example, the electronic device can define individual element or document entries in the index for each page of the document. Process 900 can then move to step 912.

If, at step 908, the electronic device instead determines that the selected document is indexed, process 900 can move to step 912. At step 912, the electronic device can query the index and identify matches to the search terms. At step 914, the electronic device can determine whether there is a match in one of the indexed documents. If the electronic device determines that there is no match, process 900 can return to step 906 and select the next document. If all documents have been selected, process 900 can move to step 918.

If, at step 914, the electronic device instead determines that there is a match with one of the indexed documents, process 900 can move to step 916. At step 916, the electronic device can add the page or pages having the match to a result list. In some embodiments, process 900 can then return to step 906 and select the next document until all documents have been selected, and subsequently move to step 918. Alternatively, process 900 can move directly to step 918. At step 918, the electronic device can clear the sidebar of all booklets. For example, the electronic device can clear column 210 of display 200 (FIG. 2). At step 920, the electronic device can select a first page of the results list. For example, the electronic device can select an as of yet unselected page from the results list (e.g., the process can recursively select each page in the results list). If all pages in the results list have been selected, process 900 can end at step 928. At step 922, the electronic device can determine whether a booklet is displayed for the selected page or document containing the page. If the electronic device determines that no booklet has been displayed yet, process 900 can move to step 924 and add an empty booklet to the sidebar for the document. Process 900 can then move to step 926.

If, at step 922, the electronic device instead determines that a booklet has been displayed, process 900 can move to step 926. At step 926, the electronic device can add a page for the result to the booklet corresponding to the document or page, and sort the page. For example, the electronic device can sort the page by page number within the document, but search result, or using any other scheme. Process 900 can them return to step 920 to select another page from the results list.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above described embodiments of the invention are presented for purposes of illustration and not of limitation.

What is claimed is:

1. A method for previewing several documents, comprising:
   selecting a plurality of documents to preview using an electronic device, wherein each document of the selected plurality of documents comprises at least one page;
   displaying with the electronic device a plurality of selectable options as a listing, wherein:
      each selectable option of the displayed plurality of selectable options is associated with a respective document of the selected plurality of documents;

each selectable option of the displayed plurality of selectable options is depicted as a respective book in the listing; and each respective book comprises a cover and a binding;

receiving with the electronic device a first user selection of a first selectable option of the displayed plurality of selectable options; and in response to the receiving:

animating with the electronic device an opening of the cover of the depicted book of the selected first selectable option over the binding of that depicted book; and displaying with the electronic device within the displayed listing a first representation of the respective document that is associated with the selected first selectable option.

2. The method of claim 1, wherein the displaying the first representation comprises:

displaying the first representation and the displayed plurality of selectable options in a one-dimensional array.

3. The method of claim 2, wherein the displaying the first representation comprises:

displaying the first representation at a position of the displayed listing that is immediately after the displayed first selectable option and that is immediately before a subsequent selectable option of the listing.

4. The method of claim 2, further comprising:

receiving a second user selection of the displayed first representation using the electronic device; and displaying a second representation of the at least one page of the respective document that is associated with the selected first selectable option in a display area of the electronic device, wherein the displayed second representation is larger than the displayed first representation.

5. The method of claim 1, wherein the displaying the first representation comprises:

displaying the first representation and the displayed plurality of selectable options in a two-dimensional array, wherein each selectable option of the displayed plurality of selectable options is displayed at a beginning of a respective row of the two-dimensional array.

6. The method of claim 5, wherein the displaying the first representation further comprises:

displaying both the selected first selectable option and the displayed first representation in a first row of the two-dimensional array; and displaying a subsequent selectable option of the listing in a second row of the two-dimensional array, wherein the second row follows the first row.

7. The method of claim 1, further comprising:

receiving a search term using the electronic device; and searching for the search term within the selected plurality of documents using the electronic device.

8. The method of claim 7, further comprising:

identifying with the electronic device at least one page of each document of at least two documents of the selected plurality of documents in which the search term is found; and displaying the identified pages using the electronic device.

9. An electronic device for previewing documents, comprising a display and a processor, the processor operative to:

receive a selection of a plurality of documents;

generate expandable options associated with each of the plurality of documents;

display the generated options in an array;

detect an instruction to expand one of the displayed options; and display in the array pages corresponding to the document associated with the one of the displayed options in response to detecting, wherein the processor is further operative to:

extract a first page of each of the plurality of documents;

apply a binding and a translucent cover to the extracted first page to generate the expandable options; and display an animation of the cover opening relative to the binding in response to detecting the instruction to expand one of the displayed options.

10. The electronic device of claim 9, wherein the processor is further operative to:

identify pages of the document associated with the one of the displayed options; and display the identified pages with the one of the displayed options in the array.

11. The electronic device of claim 10, wherein:

the array comprises at least one of a one-dimensional array and a two-dimensional array.

12. Non-transitory computer readable media for previewing several documents, comprising computer readable code recorded thereon for:

selecting a plurality of documents to preview using an electronic device, wherein each document of the selected plurality of documents comprises at least one page;

displaying with the electronic device a plurality of selectable options as a listing, wherein:

each selectable option of the displayed plurality of selectable options is associated with a respective document of the selected plurality of documents;

each selectable option of the displayed plurality of selectable options is depicted as a respective book in the listing; and each respective book comprises a cover and a binding;

receiving with the electronic device a first user selection of a first selectable option of the displayed plurality of selectable options; and in response to the receiving:

animating with the electronic device an opening of the cover of the depicted book of the selected first selectable option over the binding of that depicted book; and displaying with the electronic device within the displayed listing a first representation of the respective document that is associated with the selected first selectable option.

13. The non-transitory computer readable media of claim 12, wherein the displaying the first representation comprises:

displaying the first representation and the displayed plurality of selectable options in a one-dimensional array.

14. The non-transitory computer readable media of claim 12 further comprising computer readable code recorded thereon for:

receiving a second user selection of the displayed first representation using the electronic device; and displaying a second representation of the at least one page of the respective document that is associated with the selected first selectable option in a display area of the electronic device, wherein the displayed second representation is larger than the displayed first representation.

* * * * *